(12) United States Patent
Kao

(10) Patent No.: US 7,031,062 B2
(45) Date of Patent: Apr. 18, 2006

(54) ASSEMBLY OF BEAM SPLITTERS

(75) Inventor: Po-Sung Kao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 185 days.

(21) Appl. No.: 10/792,010

(22) Filed: Mar. 3, 2004

(65) Prior Publication Data

US 2004/0184023 A1    Sep. 23, 2004

(30) Foreign Application Priority Data

Mar. 18, 2003  (TW) .............................. 92105887 A

(51) Int. Cl.
*G02B 27/10* (2006.01)
*G02B 5/04* (2006.01)
*G01C 3/08* (2006.01)

(52) U.S. Cl. ...................... 359/618; 359/836; 359/831; 356/4.01

(58) Field of Classification Search ................ 359/618, 359/836, 831, 833, 834, 608, 638–640, 30; 356/4.01, 5.01, 5.1

See application file for complete search history.

(56) References Cited

U.S. PATENT DOCUMENTS 3,558,207 A * 1/1971 Worthington ................ 359/30

6,441,887 B1 * 8/2002 Kao ........................... 356/4.01
6,945,657 B1 * 9/2005 Shirai et al. ................ 359/608

\* cited by examiner

*Primary Examiner*—Loha Ben
(74) *Attorney, Agent, or Firm*—Thomas, Kayden, Horstemeyer & Risley

(57) ABSTRACT

An assembly of beam splitters of the invention includes a roof-prism, a triangle prism and a complementary prism; wherein the roof-prism has a first emitting/receiving surface, the triangle prism has a second emitting/receiving surface and the complementary prism has a third emitting/receiving surface and a fourth emitting/receiving surface. A beam of first wavelength enters the assembly of beam splitters through the second emitting/receiving surface, and leaves it through the first emitting/receiving surface. A beam of second wavelength parallel to the beam of first wavelength enters the assembly of beam splitters through the second emitting/receiving surface, and leaves it through the third emitting/receiving surface. A beam of third wavelength enters the assembly of beam splitters through the fourth emitting/receiving surface, and leaves it through the first emitting/receiving surface. Thus, the optical axis of the beam of third wavelength is parallel to the optical axis of the beam of first wavelength. In addition, an optical rangefinder uses the assembly of beam splitters, and shows data in dark environment well.

8 Claims, 9 Drawing Sheets

ASSEMBLY OF BEAM SPLITTERS

BACKGROUND OF THE INVENTION

1. Field of the Invention

This invention relates to an assembly of beam splitters, and more particularly, to a rangefinder utilizing the assembly of beam splitters.

2. Description of the Related Art

FIG. 1 schematically shows a conventional optical rangefinder, which is disclosed in U.S. Pat. No. 6,441,887. In this patent, the optical range-finder 10 includes a viewing/emitting optical system 11 and a receiving system 12; wherein the viewing/emitting optical system 11 includes a prism unit 13, a first object lens 14, an emitter 15, a display 16 and an ocular lens 17. After measuring the distance between the user and the object, the display 16 shows the distance.

In this optical rangefinder 10, the display 16 is a transmitted LCD. When visible light enters the viewing/emitting optical system 11, the display 16 shows the distance by passing visible light through the display 16. However, the optical rangefinder 10 is used in the dark environment, only a few light enters the viewing/emitting optical system 11. Therefore, the data shown by the LCD 16 is indistinct.

SUMMARY OF THE INVENTION

To solve the above problems, it is an object of the present invention to provide an assembly of beam splitters for applying in an optical rangefinder.

According to the object of the invention, the assembly of beam splitters includes a triangle prism, a roof-prism and a complementary prism. The assembly of beam splitters has four emitting/receiving surfaces. The roof-prism has a first emitting/receiving surface, the triangle prism has a second emitting/receiving surface, and the complementary prism has a third emitting/receiving surface and a fourth emitting/receiving surface. When a beam of first wavelength enters the assembly of beam splitters through the second emitting/receiving surface, the beam of first wavelength leaves the assembly of beam splitters from the first emitting/receiving surface. When a beam of second wavelength enters the assembly of beam splitters through the third emitting/receiving surface, the beam of second wavelength leaves the assembly of beam splitters from the second emitting/receiving surface. When a beam of third wavelength enters the assembly of beam splitters through the fourth emitting/receiving surface, the beam of third wavelength leaves the assembly of beam splitters from the first emitting/receiving surface.

One aspect of the optical rangefinder of the present invention includes a viewing/emitting optical system having a first object lens, the assembly of beam splitters, an emitter, a display and an ocular lens, and a receiving optical system having a second object lens and a detector.

Another aspect of the optical rangefinder of the present invention includes a viewing/receiving optical system having a first object lens, the assembly of beam splitters, a detector, a display and an ocular lens, and an emitting optical system having a second object lens and an emitter.

The optical rangefinder of the invention utilizes a display illuminating actively. Thus, the optical rangefinder can operate well in the dark environment.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
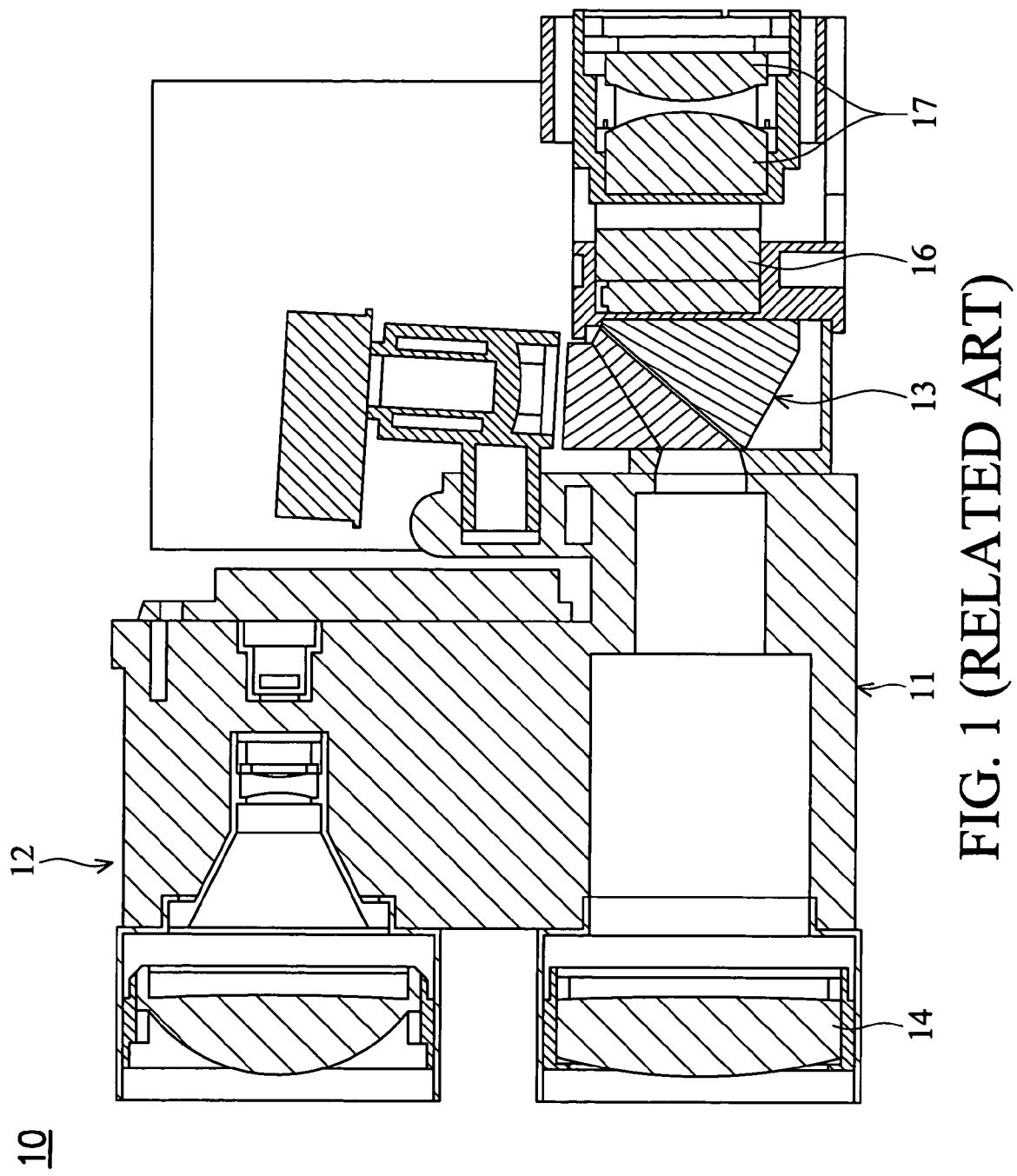
FIG. 1 schematically shows an optical range-finder disclosed in U.S. Pat. No. 6,441,887.
Figure 2:
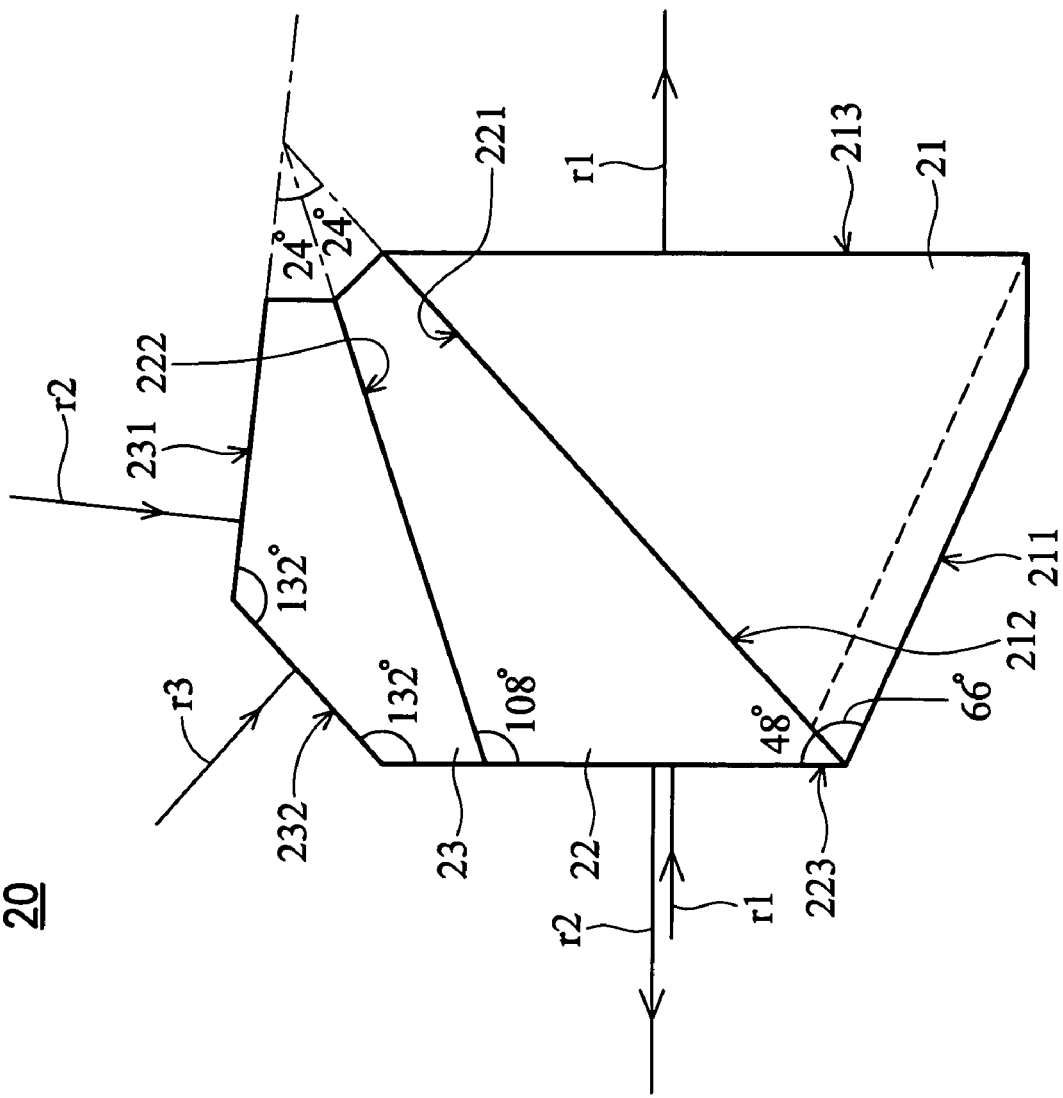
FIG. 2 schematically shows an assembly of beam splitters of this invention.

FIG. 2 schematically shows the assembly of beam splitters of this invention. The assembly of beam splitters 20 includes a roof-prism 21, a triangle prism 22 and a complementary prism 23. The roof-prism 21 has a roof surface 211, a reflecting surface 212 and first emitting/receiving surface 213. The triangle prism 22 has a total internal reflecting surface (TIR-surface) 221, a reflecting surface 222 and a second emitting/receiving surface 223, wherein the reflecting surface 222 reflects a beam of first wavelength. The reflecting surface 222 and the second emitting/receiving surface 223 form an included angle of 108°, the TIR-surface 221 and the second emitting/receiving surface 223 form and included angle of 48°, and the TIR-surface 221 and the reflecting surface 222 form an included angle of 24°. The TIR-surface 221 of the triangle prism 22 is adjacent to the reflecting surface 212 of the roof-prism 21. The complementary prism 23 includes a third emitting/receiving surface 231 and a fourth emitting/receiving surface 232, and the complementary prism 23 is located adjacent to the reflecting surface 222 of the triangle prism 22. The fourth emitting/receiving surface 232 and the third emitting/receiving surface 231 form an included angle of 132□, and the fourth emitting/receiving surface 232 and the second emitting/receiving surface 223 form an included angle of 132□.

Figure 3A:
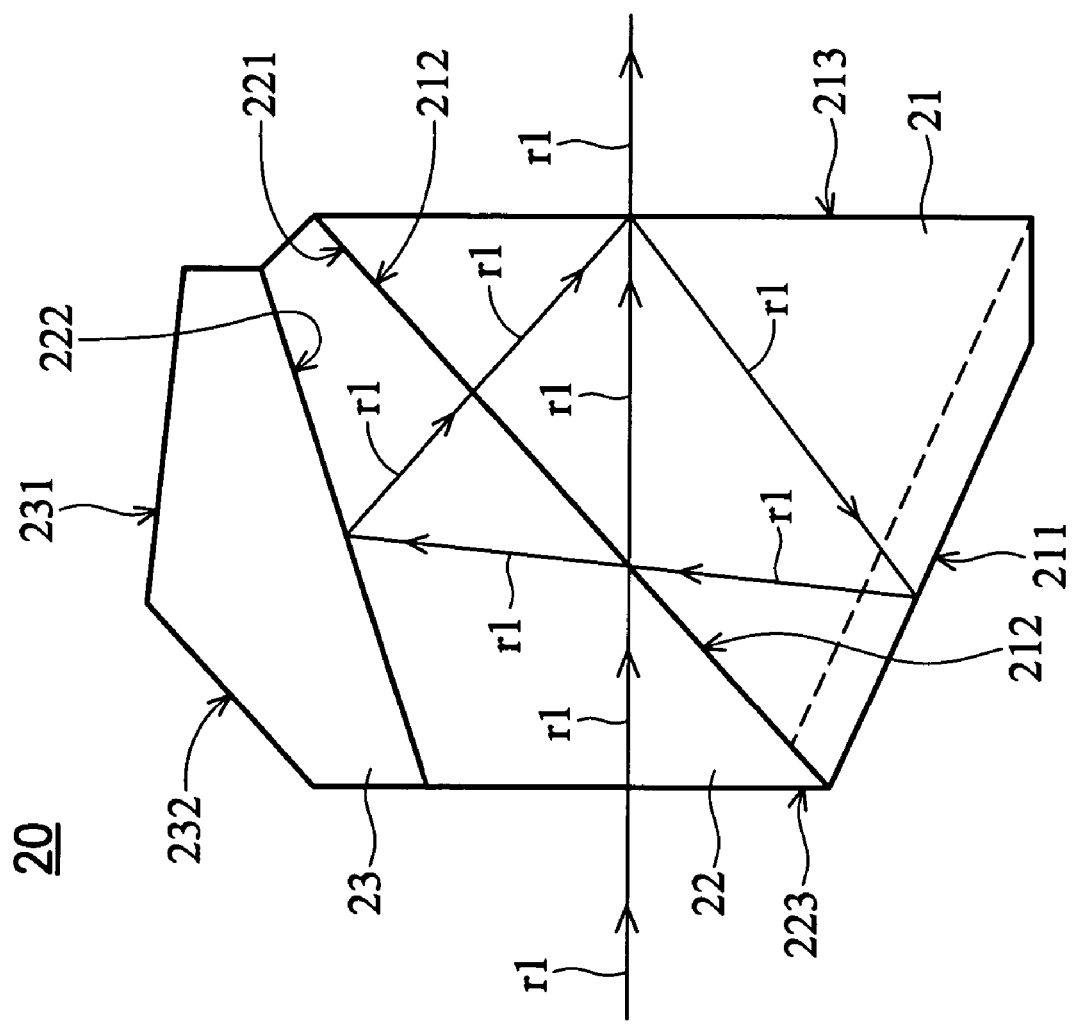
FIGS. 3A to 3C schematically show the ray tracings of different wavelengths in the assembly of beam splitters.

Referring to FIG. 3A, after the beam of first wavelength r1 enters the triangle prism 22 from the second emitting/receiving surface 223, the beam of first wavelength r1 is reflected by TIR-surface 221 of the triangle prism 22 so as to travel toward the reflecting surface 222. The film surface 222 reflects the beam of first wavelength r1, and then the beam of first wavelength r1 is incident on TIR-surface 221 at an incident angle smaller than the critical incident angle and passes TIR-surface 221. The beam of first wavelength r1 is incident on the reflecting surface 212 and enters the roof-prism 21. In the roof-prism 21, the beam of first wavelength r1 is sequentially reflected by the first emitting/receiving surface 213, the roof surface 211 and the reflecting surface 212, and is incident on the first emitting/receiving surface 213 at an incident angle smaller than the critical incident angle. The beam of first wavelength r1 passes the first emitting/receiving surface 213 and then is emitted from the roof-prism 21.

Figure 3C:
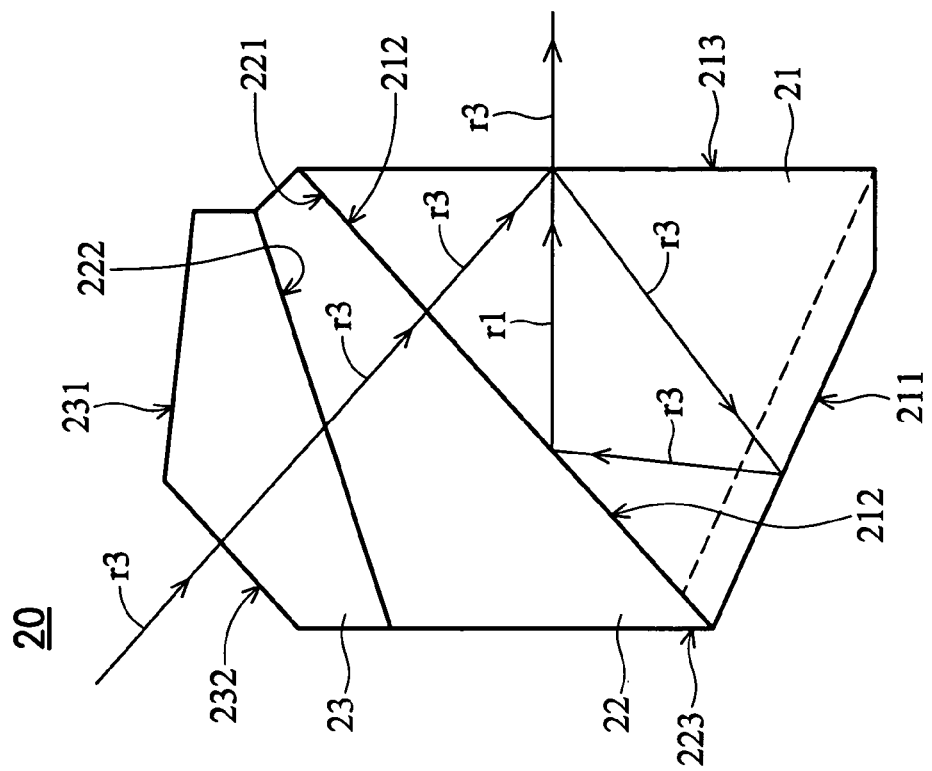
Figure 3B:
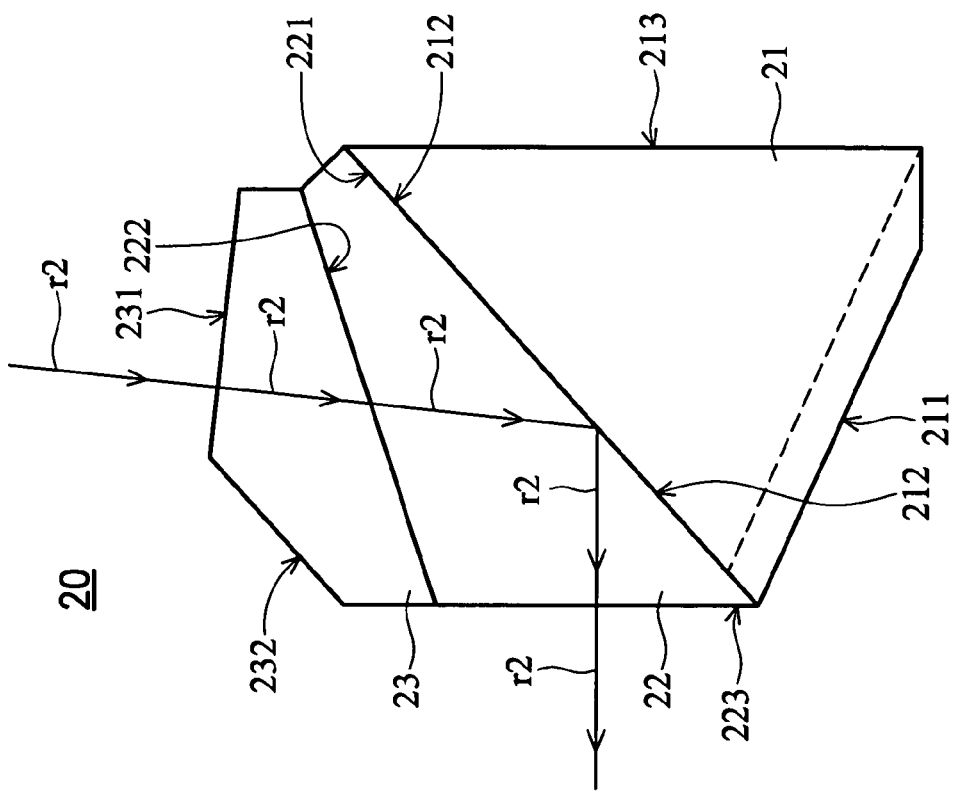

Referring to FIG. 3B, after the beam of second wavelength r2 is incident on the third emitting/receiving surface 231 of the complementary prism 23, the beam of second wavelength r2 passes the reflecting surface 222 between the complementary prism 23 and the triangle prism 22 and enters the triangle prism 22. In triangle prism 22, the beam of second wavelength r2 follows the path of the beam of first wavelength r1. Thus, the beam of second wavelength r2 is reflected by the TIR-surface 221 and leaves the assembly of beam splitters 20 via the second emitting/receiving surface 223. Similarly, the beam of second wavelength r2 can reversely enter the triangle prism 22 through the second emitting/receiving surface 223, and then leaves the assembly of beam splitters 20 through the third emitting/receiving surface 231 of the complementary prism 23.

Referring to FIG. 3C, the beam of third wavelength r3 is incident on the fourth emitting/receiving surface 232 of the complementary prism 23, and then the beam of third wavelength r3 passes the reflecting surface 222 between the complementary prism 23 and the triangle prism 22, and the TIR-surface 221. Thus, the beam of third wavelength r3 enters the roof-prism 21. In the roof-prism 21, the beam of third wavelength r3 follows the path of the beam of first wavelength r1, and leaves the assembly of beam splitters 20 through the first emitting/receiving surface 213. Similarly, the beam of third wavelength r3 can reversely enter the roof-prism 21 through the first emitting/receiving surface 213, and then leaves the assembly of beam splitters 20 through the fourth emitting/receiving surface 232 of the complementary prism 23.

First Embodiment

Figure 4:
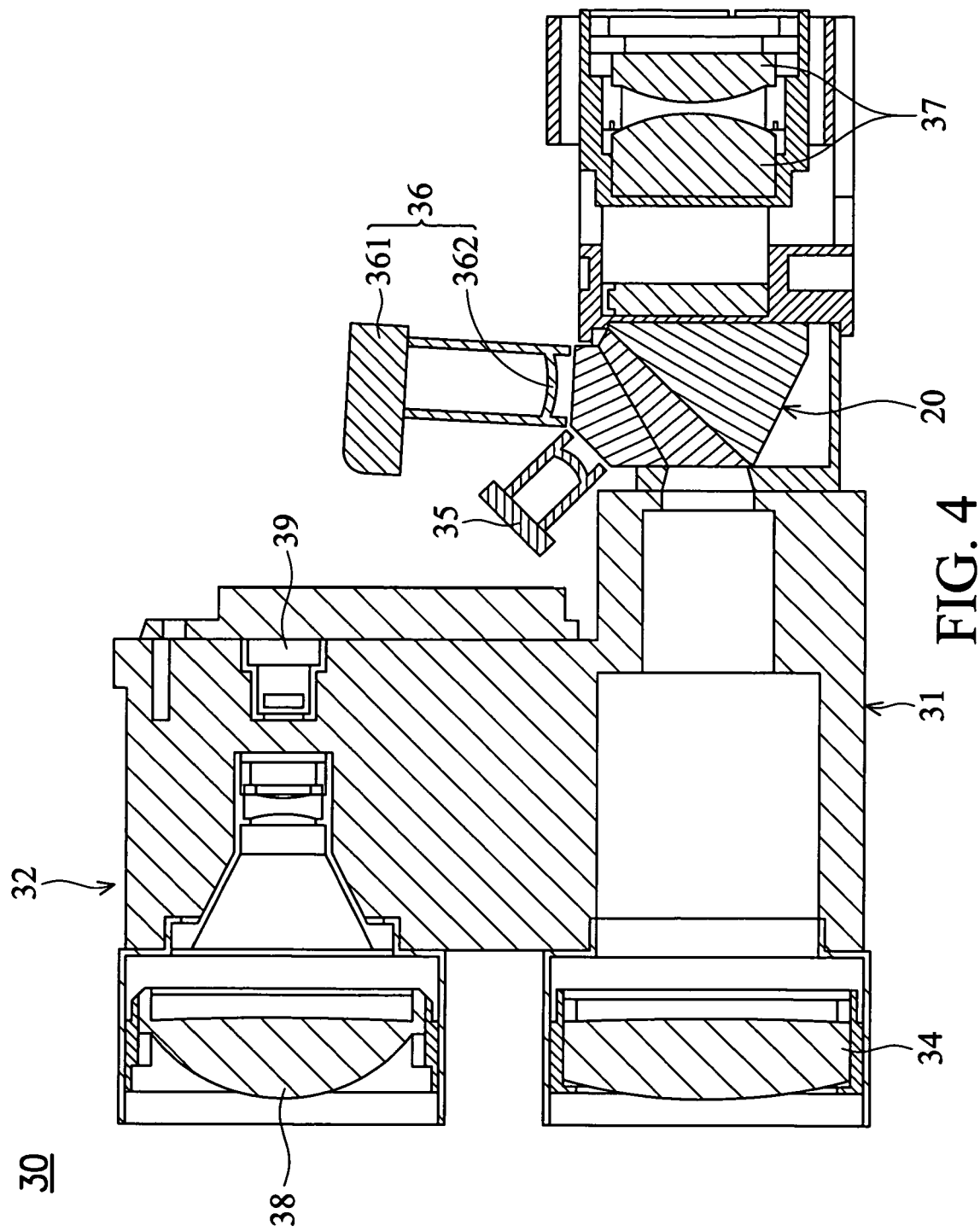
FIG. 4 schematically shows an optical rangefinder using the assembly of beam splitters.

FIG. 4 schematically shows an optical rangefinder using the assembly of beam splitters. As shown in FIG. 4, the optical rangefinder 30 includes a receiving optical system 32 and a viewing/emitting optical system 31. The viewing/emitting optical system 31 includes a first object lens 34, the assembly of beam splitters 20 mentioned above, a display 35, an emitter 36 and an ocular lens 37. The receiving optical system 32 includes a second object lens 38 and a detector 39.

Image of visible light produced by a target enters the optical range-finder 30 through the first object lens 34, and then the image enters the assembly of beam splitters 20 through the second emitting/receiving surface 223. In the assembly of beam splitters 20, the image follows the path of the beam of first wavelength r1, and leaves the assembly of beam splitters 20 through the fist emitting/receiving surface 213. Next, the image passes the ocular lens 37, and the user sees the target (not shown) clearly.

The emitter 36 includes a laser diode 361 and a lens set 362, and emits an infrared beam. The infrared beam enters the assembly of beam splitters 20 through the third emitting/receiving surface 231 of the complementary prism 23. Thus, the infrared beam follows the path of the beam of second wavelength r2, and leaves the assembly of beam splitters 20 through the second emitting/receiving surface 223. The infrared beam passes the first object lens 34 and travels toward the target. Next, the target reflects the infrared beam, and portion of the reflected infrared beam passes the second object lens 38 to enter the receiving optical system 32. Finally, the detector 39 receives the infrared beam. The optical rangefinder 30 bases on a round-trip flight-time of the infrared beam, and obtains the distance.

Figure 5:
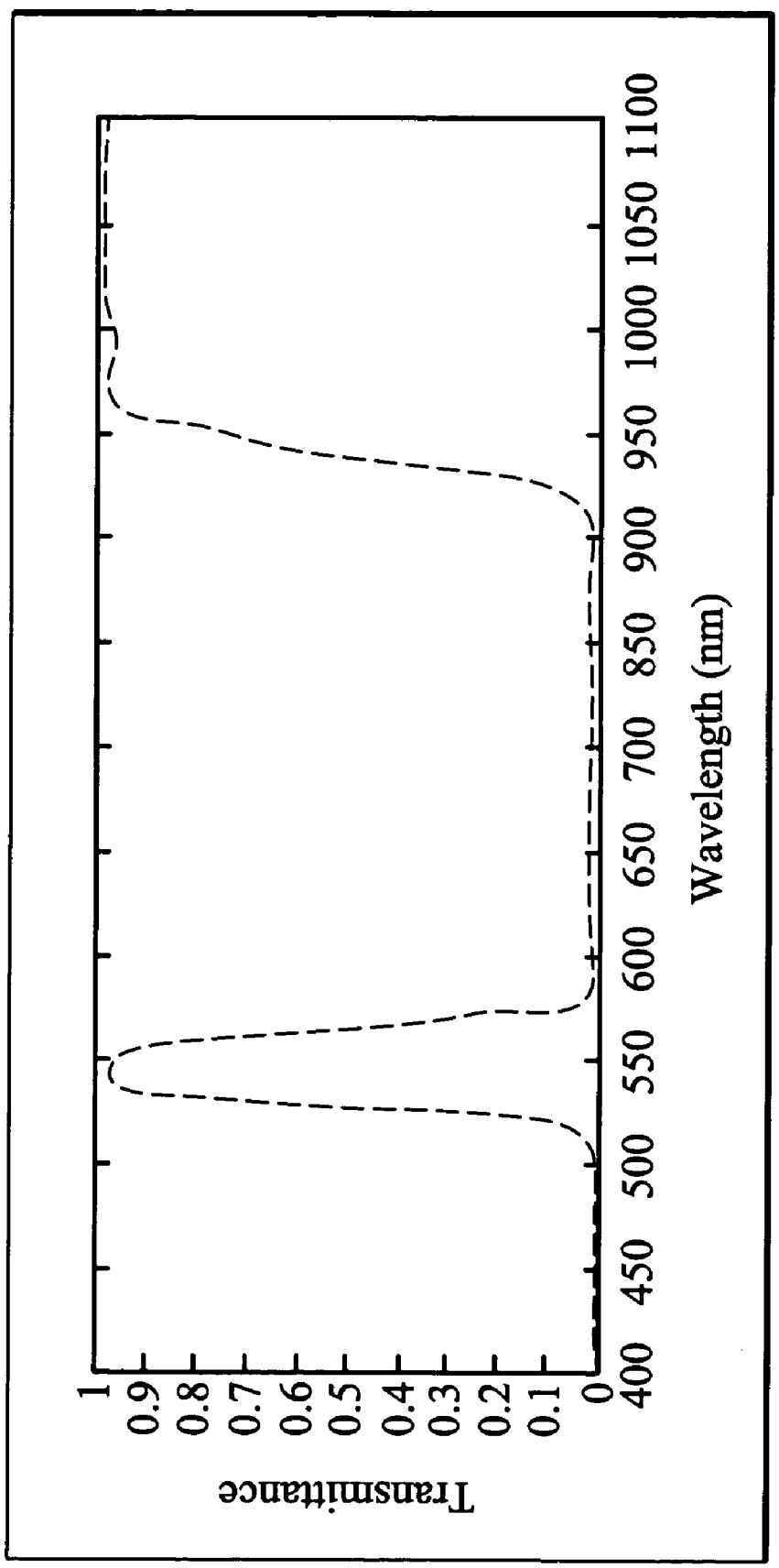
FIG. 5 schematically shows a transmitted spectrum of a film of a triangle prism.

The display 35, such as a liquid crystal display, a LED display . . . etc., actively emits a beam with narrow band and shows the distant values. The display 35 emits a beam with predetermined wavelength and enters the assembly of beam splitters 20 through the fourth emitting/receiving surface 232 of the complementary prism 23. FIG. 5 schematically shows a transmitted spectrum of a film formed between a triangle prism and a complementary prism. Referring to FIGS. 4 and 5, when the display 35 emits a beam of 550 nm, the beam follows the path of the beam of third wavelength r3. The beam of 550 nm enters the assembly of beam splitters 20, and leaves it through the first emitting/receiving surface 213. The beam of 550 nm passes the ocular lens 37 and will be received by the user. Thus, the user obtains the distance by seeing the data shown on display.

Second Embodiment

Figure 6:
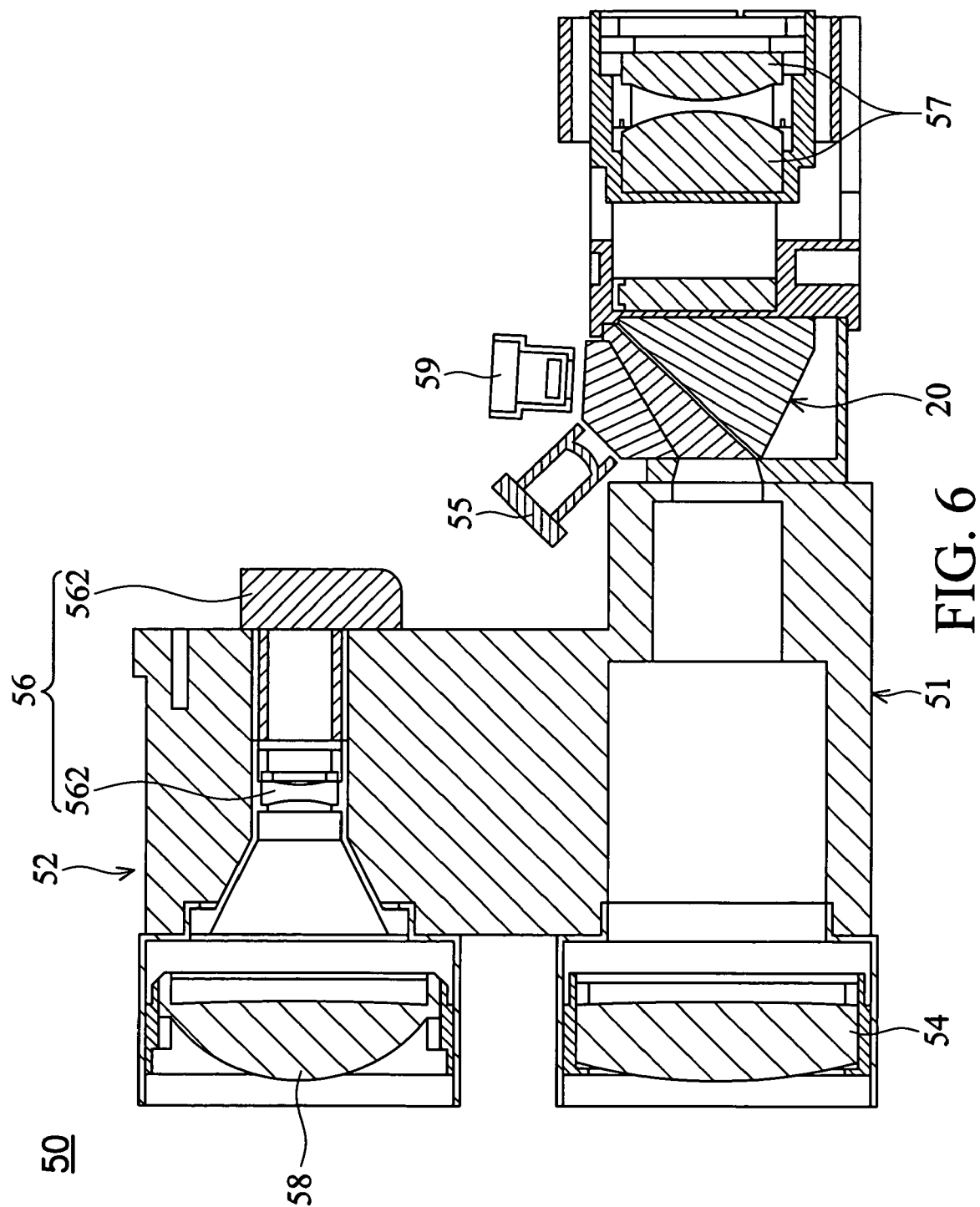
FIG. 6 schematically shows another optical rangefinder of the invention using the assembly of beam splitters.

FIG. 6 schematically shows an optical rangefinder using the assembly of beam splitters. As shown in FIG. 6, the optical rangefinder 50 includes an emitting optical system 52 and a viewing/receiving optical system 51. The viewing/receiving optical system 51 includes a fist object lens 54, the assembly of beam splitters 20 mentioned above, a display 55, a detector 59 and an ocular lens 57. The emitting optical system 52 includes a second object lens 58 and an emitter 56.

Image of visible light produced by a target enters the optical rangefinder 50 through the fist object lens 54, and then the image enters the assembly of beam splitters 20 through the second emitting/receiving surface 223. In the assembly of beam splitters 20, the image follows the path of the beam of first wavelength r1, and leaves the assembly of beam splitters 20 through the first emitting/receiving surface 213. Next, the image passes the ocular lens 57, and the user sees the target clearly.

The emitter 56 includes a laser diode 561 and a lens set 562, and emits an infrared beam. The infrared beam passes the second object lens 58, and travels toward the target. The target reflects the infrared beam, and portion of the reflected infrared beam passes the fist object lens 54 to enter the viewing/receiving optical system 51. In the viewing/receiving optical system 51, the infrared beam enters the assembly of beam splitters 20 through the second emitting/receiving surface 223 of the triangle prism 22, and follows the path of the beam of second wavelength r2. Thus, the infrared beam leaves the assembly of beam splitters 20 through the third emitting/receiving surface 231 of the complementary prism 23, and is received by the detector 59. The optical rangefinder 50 bases on a round-trip flight-time of the infrared beam, and obtains the distance between the optical rangefinder and the target.

The display 55, such as a liquid crystal display, a LED display . . . etc., actively emits a beam with narrow band and shows the distant values. The display 55 emits a beam with predetermined wavelength and enters the assembly of beam splitters 20 through the complementary prism 23 of the fourth emitting/receiving surface 232. FIG. 5 schematically shows a transmitted spectrum of a film formed between a triangle prism and a complementary prism. Referring to FIGS. 5 and 6, when display 55 emits a beam of 550 nm, the beam follows the path of the beam of third wavelength r3. The beam of 550 nm enters the assembly of beam splitters 20, and leaves it through the first emitting/receiving surface 213. The beam of 550 nm passes the ocular lens 57 and will be received by the user. Thus, the user obtains the distance by seeing the data shown on display.

Third Embodiment

Figure 7:
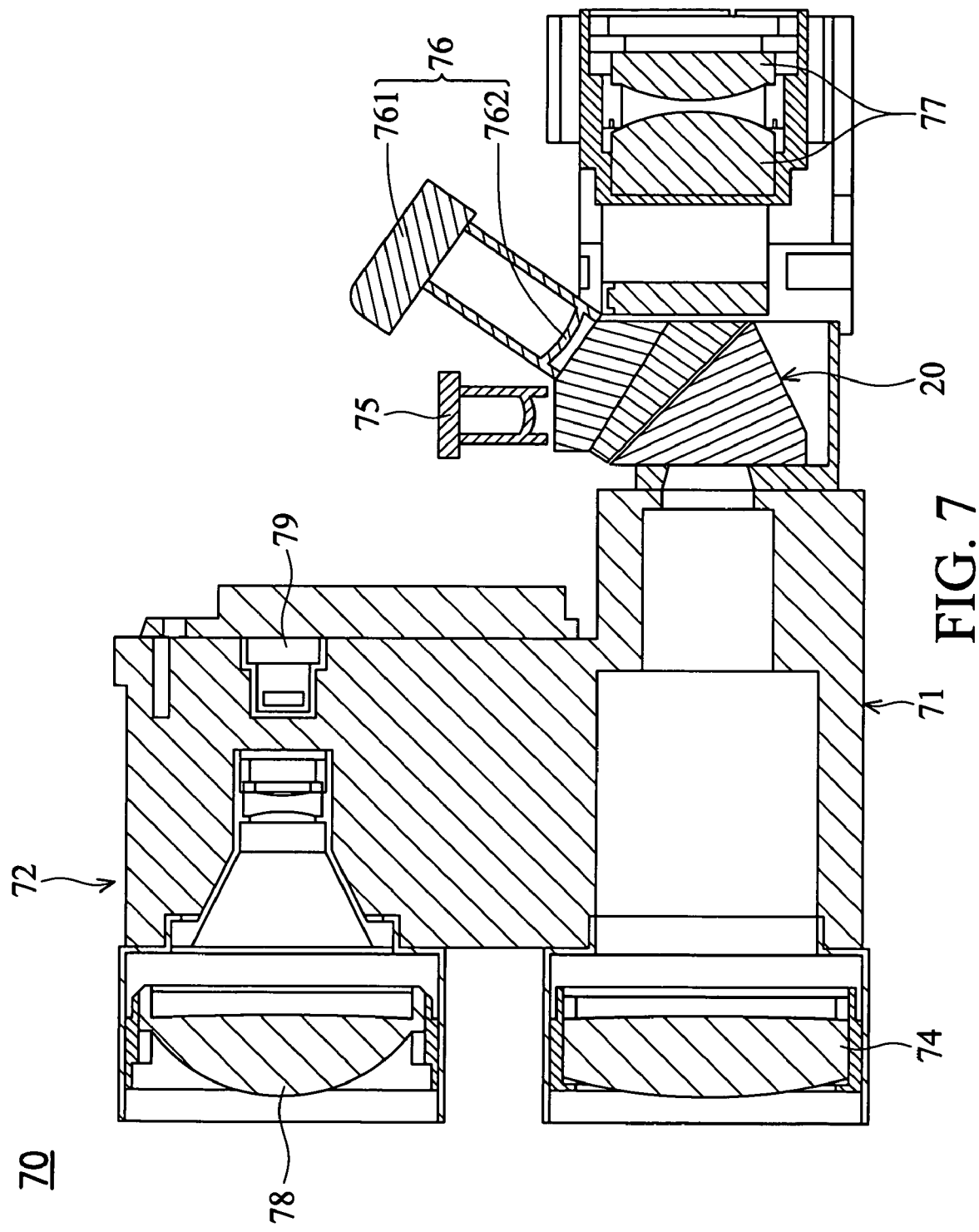
FIG. 7 schematically shows another optical rangefinder of the invention using the assembly of beam splitters.

FIG. 7 schematically shows an optical rangefinder using the assembly of beam splitters. As show in FIG. 7, the optical rangefinder 70 includes a receiving optical system 72 and a viewing/emitting optical system 71. The viewing/emitting optical system 71 includes a first object lens 74, the assembly of beam splitters 20 mentioned above, a display 75, an emitter 76 and an ocular lens 77. The receiving optical system 72 includes a second object lens 78 and a detector 79.

Image of visible light produced by a target enters the optical rangefinder 70 through the first object lens 74, and then the image enters the assembly of beam splitters 20 through the first emitting/receiving surface 213. In the assembly of beam splitters 20, the image follows the path of the beam of first wavelength r1, and leaves the assembly of beam splitters 20 through the second emitting/receiving surface 223. Next, the image passes the ocular lens 77, and the user sees the target (not shown) clearly.

The emitter 76 includes a laser diode 761 and a lens set 762, and emits an infrared beam. The infrared beam enters the assembly of beam splitters 20 through the fourth emitting/receiving surface 232 of the complementary prism 23. Thus, the infrared beam follows the path of the beam of third wavelength r3, and leaves the assembly of beam splitters 20 through the first emitting/receiving surface 213. The infrared beam passes the first object lens 74 and travels toward the target. Next, the target reflects the infrared beam, and portion of the reflected infrared beam passes the second object lens 78 to enter the receiving optical system 72. Finally, the detector 79 receives the infrared beam. The optical rangefinder 70 bases on a round-trip flight-time of the infrared beam, and obtains the distance.

The display 75, such as a liquid crystal display, a LED display . . . etc., actively emits a beam with narrow band and shows the distant values. The display 75 emits a beam with predetermined wavelength and enters the assembly of beam splitters 20 through the third emitting/receiving surface 231 of the complementary prism 23. FIG. 5 schematically shows a transmitted spectrum of a film formed between a triangle prism and a complementary prism. Referring to FIGS. 7 and 5, when display 75 emits a beam of 550 nm, the beam follows the path of the beam of second wavelength r2. The beam of 550 nm enters the assembly of beam splitters 20, and leaves it through the second emitting/receiving surface 223. The beam of 550 nm passes the ocular lens 77 and will be received by the user. Thus, the user obtains the distance by seeing the data shown on display.

Fourth Embodiment

Figure 8:
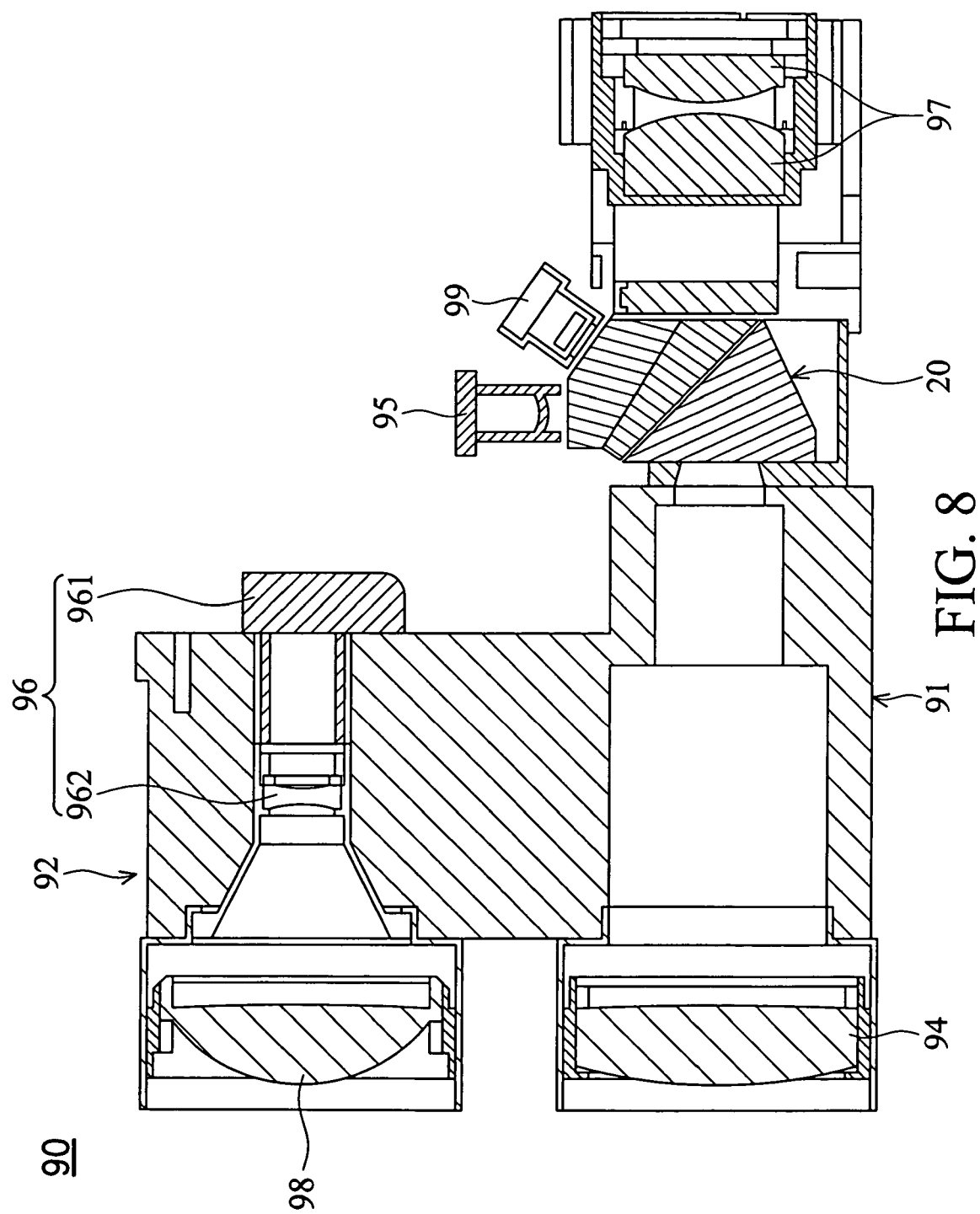
FIG. 8 schematically shows another optical rangefinder of the invention using the assembly of beam splitters.

FIG. 8 schematically shows an optical rangefinder using the assembly of beam splitters. As show in FIG. 8, the optical rangefinder 90 includes an emitting optical system 92 and a viewing/receiving optical system 91. The viewing/receiving optical system 91 includes a first object lens 94, the assembly of beam splitters 20 mentioned above, a display 95, a detector 99 and an ocular lens 97. The receiving optical system 92 includes a second object lens 98 and an emitter 96.

Image of visible light produced by a target enters the optical rangefinder 90 through the first object lens 94, and then the image enters the assembly of beam splitters 20 through the first emitting/receiving surface 213. In the assembly of beam splitters 20, the image follows the path of the beam of first wavelength r1, and leaves the assembly of beam splitters 20 through the second emitting/receiving surface 223. Next, the image passes the ocular lens 97, and the user sees the target (not shown) clearly.

The emitter 96 includes a laser diode 961 and a lens set 962, and emits an infrared beam. The infrared beam passes the second object lens 98, and travels toward the target. The target reflects the infrared beam, and portion of the reflected infrared beam passes the fist object lens 94 to enter the viewing/receiving optical system 91. In the viewing/receiving optical system 91, the infrared beam enters the assembly of beam splitters 20 through the first emitting/receiving surface 213 of the roof-prism 21, and follows the path of the beam of third wavelength r3. Thus, the infrared beam leaves the assembly of beam splitters 20 through the fourth emitting/receiving surface 232 of the complementary prism 23, and is received by the detector 99. The optical rangefinder 90 bases on a round-trip flight-time of the infrared beam, and obtains the distance between the optical rangefinder and the target.

The display 95, such as a liquid crystal display, a LED display . . . etc., actively emits a beam with narrow band and shows the distant. The display 95 emits a beam with predetermined wavelength and enters the assembly of beam splitters 20 through the complementary prism 23 of the third emitting/receiving surface 231. FIG. 5 schematically shows a transmitted spectrum of a film formed between a triangle prism and a complementary prism. Referring to FIGS. 7 and 5, when display 95 emits a beam of 550 nm, the beam follows the path of the beam of second wavelength r2. The beam of 550 nm enters the assembly of beam splitters 20, and leaves it through the second emitting/receiving surface 223. The beam of 550 nm passes the ocular lens 77 and will be received by the user. Thus, the user obtains the distance by seeing the data shown on display.

The assembly of beam splitters combines the optical paths of different beams together. Thus, the beams from different directions are traveled in the same direction.

In this invention, the display can use the Organic Light-Emitting Diode.

In the optical rangefinder using the assembly of beam splitters of the invention, the infrared beam from the emitter and the image produced by the target pass the same object lens; and the beam with narrow band from the display and the image produced by the target pass the same ocular lens.

Because the optical rangefinder of the invention use a display which actively emits light, the optical rangefinder can show the distant value in the dark environment.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. An assembly of beam splitters, comprising:
   a roof-prism, comprising a first emitting/receiving surface, a roof surface and a first reflecting surface, when a beam of first wavelength enters the roof-prism through the first emitting/receiving surface, the beam of first wavelength is sequentially reflected by the first reflecting surface, the roof surface and the first emitting/receiving surface and leaves the roof-prism from the first reflecting surface;
   a triangle prism, comprising a second emitting/receiving surface, a second reflecting surface and a total internal reflecting surface, wherein the beam of first wavelength from the roof-prism enters the triangle prism through the total internal reflecting surface, and is sequentially reflected by the second reflecting surface and the total internal reflecting surface and leaves the triangle prism from the second emitting/receiving surface; and a complementary prism, which is adjacent to the second reflecting surface of the triangle prism, and comprises a third emitting/receiving surface and a fourth emitting/receiving surface;

wherein a beam of second wavelength enters the complementary prism through the third emitting/receiving surface and passes the second reflecting surface to enter the triangle prism, and then the beam of second wavelength is emitted from the second emitting/receiving surface of the triangle prism by reflecting by the total internal reflecting surface, so that the optical axis of the beam of second wavelength and the optical axis of the beam of first wavelength are coaxial; and wherein a beam of third wavelength enters the complementary prism through the fourth emitting/receiving surface and passes the second reflecting surface to enter the triangle prism, and then the beam of third wavelength passes the first reflecting surface to enter the roof-prism and is sequentially reflected by the first emitting/receiving surface, the roof surface and the first reflecting surface so as to emit from the first emitting/receiving surface of the roof-prism, so that the optical axis of the beam of third wavelength and the optical axis of the beam of first wavelength are coaxial.

2. The assembly of beam splitters as claimed in claim 1, wherein the beam of first wavelength is reflected by the second reflecting surface, and the beam of second wavelength and the beam of third wavelength travel through the second reflecting surface.

3. The assembly of beam splitters as claimed in claim 1, wherein the second emitting/receiving surface and the total internal reflecting surface form a 48° included angle, the second emitting/receiving surface and the second reflecting surface form a 108° included angle, the second reflecting surface and the total internal reflecting surface form a 24° included angle, the third emitting/receiving surface and the fourth emitting/receiving surface form a 132° included angle, the fourth emitting/receiving surface and the second emitting/receiving surface form a 132° included angle, and the third emitting/receiving surface and the second reflecting surface form a 24° included angle.

4. The assembly of beam splitters as claimed in claim 1, wherein the beam of second wavelength enters the second emitting/receiving surface of the triangle prism and is reflected to the complementary prism by the total internal reflecting surface, so as to emit from the third emitting/receiving surface of the complementary prism;

and the beam of third wavelength passes the first emitting/receiving surface and is sequentially reflected by the first reflecting surface, the roof surface and the first emitting/receiving surface, and then the beam of third wavelength travels through the triangle prism to enter the complementary prism, so that the beam of third wavelength is emitted from the fourth emitting/receiving surface.

5. An assembly of beam, comprising:

a triangle prism comprising a second emitting/receiving surface, a second reflecting surface and a total internal reflecting surface, wherein a beam of first wavelength enters the triangle prism through the second emitting/receiving surface and is sequentially reflected by the total internal reflecting surface and the second reflecting surface, so as to emit from the total internal reflecting surface;

a roof-prism comprising a first emitting/receiving surface, a roof surface and a first reflecting surface, wherein the beam of first wavelength from the triangle prism enters the roof-prism through the first reflecting surface, and is sequentially reflected by the first emitting/receiving surface, the roof surface and the first reflecting surface, so as to emit from the first emitting/receiving surface; and a complementary prism, which is adjacent to the second reflecting, and comprises a third emitting/receiving surface and a fourth emitting/receiving surface;

wherein a beam of second wavelength enters the complementary prism through the third emitting/receiving surface and passes the second reflecting surface to enter the triangle prism, the beam of second wavelength is reflected by the total internal reflecting surface and emitted from the second emitting/receiving surface of the triangle prism, so that the optical axis of the beam of second wave-length and the optical axis of the beam of first wavelength are coaxial; and wherein a beam of third wavelength enters the complementary prism through the fourth emitting/receiving surface and passes the second reflecting surface to enter the triangle prism, the beam of third wavelength passes the first reflecting surface to enter the roof-prism and is sequentially reflected by the first emitting/receiving surface, the roof surface and the total internal reflecting surface and emitted from the first emitting/receiving surface of roof-prism, so that the optical axis of the beam of third wavelength and the optical axis of the beam of first wavelength are coaxial.

6. The assembly of beam splitters as claimed in claim 5, wherein the beam of first wavelength is reflected by the second reflecting surface, and the beam of second wavelength and the beam of third wavelength passes through the second reflecting surface.

7. The assembly of beam splitters as claimed in claim 5, wherein the second emitting/receiving surface and the total internal reflecting surface form a 48° included angle, the second emitting/receiving surface and the second reflecting surface form a 108° included angle, the second reflecting surface and the total internal reflecting surface form a 24° included angle, the third emitting/receiving surface and the fourth emitting/receiving surface form a 132° included angle, the fourth emitting/receiving surface and the second emitting/receiving surface form a 132° included angle, and the third emitting/receiving surface and the second reflecting surface form a 24° included angle.

8. The assembly of beam splitters as claimed in claim 5, wherein the beam of second wavelength enters the triangle prism through the second emitting/receiving surface and is reflected to the complementary prism by the total internal reflecting surface, so as to emit from the third emitting/receiving surface of the complementary prism; and the beam of third wavelength enters the roof-prism through the first emitting/receiving surface and is sequentially reflected by the first reflecting surface, the roof surface and the first emitting/receiving surface, and then the beam of third wavelength travels through the triangle prism to enter the complementary prism, so that the beam of third wavelength is emitted from the fourth emitting/receiving surface.

* * * * *